United States Patent
Leonhardt et al.

(10) Patent No.: US 11,898,958 B2
(45) Date of Patent: Feb. 13, 2024

(54) METHOD FOR MEASURING THE TRAP DENSITY IN A 2-DIMENSIONAL SEMICONDUCTOR MATERIAL

(71) Applicants: IMEC VZW, Leuven (BE); Katholieke Universiteit Leuven, KU LEUVEN R&D, Leuven (BE)

(72) Inventors: Alessandra Leonhardt, Leuven (BE); Cesar Javier Lockhart De La Rosa, Haacht (BE); Stefan De Gendt, Wijnegem (BE); Cedric Huyghebaert, Heverlee (BE); Steven Brems, Kessel-Lo (BE); Thomas Nuytten, Pellenberg (BE)

(73) Assignees: IMEC VZW, Leuven (BE); Katholieke Universitiet, Leuven (BE)

( * ) Notice: Subject to any disclaimer, the term of this patent is extended or adjusted under 35 U.S.C. 154(b) by 0 days.

(21) Appl. No.: 17/323,115

(22) Filed: May 18, 2021

(65) Prior Publication Data
US 2021/0356399 A1 Nov. 18, 2021

(30) Foreign Application Priority Data
May 18, 2020 (EP) .................... 20175167

(51) Int. Cl.
*G01N 21/64* (2006.01)
*G01N 21/95* (2006.01)

(52) U.S. Cl.
CPC ..... *G01N 21/6489* (2013.01); *G01N 21/9501* (2013.01)

(58) Field of Classification Search
CPC .......... G01N 21/6489; G01N 21/6408; G01N 2021/646
See application file for complete search history.

(56) References Cited

U.S. PATENT DOCUMENTS

2014/0034816 A1* 2/2014 Chuang ............. H01L 27/14893
250/216
2017/0067830 A1* 3/2017 Adell .................. G01N 21/636
(Continued)

OTHER PUBLICATIONS

Extended European Search Report and Written Opinion, Application No. EP20175167.4, dated Nov. 20, 2020, 14 pages.
(Continued)

*Primary Examiner* — Tarifur R Chowdhury
*Assistant Examiner* — Kemaya Nguyen
(74) *Attorney, Agent, or Firm* — McDonnell Boehnen Hulbert & Berghoff LLP

(57) ABSTRACT

A spot on a layer of a 2D semiconductor material deposited on a substrate is irradiated so as to generate excitons, so that photons are emitted from the layer. The photoluminescence spectrum is recorded for different values of the charge carrier concentration in the layer. The modulation of the charge carrier concentration may be realized by modulating the output power of the light source used to irradiate the sample. The relation is recorded between the ratio of the photoluminescence intensity of a first peak in the spectrum related to radiative recombination from indirect bandgaps to the intensity of a second peak in the spectrum related to radiative recombination from direct bandgaps, and the carrier concentration. This relation is fitted to a model of the ratio that takes into account multiple recombination mechanisms, radiative and non-radiative. From this process, the trap density within the bandgap is derived.

9 Claims, 3 Drawing Sheets

(56) References Cited

U.S. PATENT DOCUMENTS

2018/0144849 A1     5/2018   Jonker
2018/0374962 A1*   12/2018   Das ...................... H01L 29/778

OTHER PUBLICATIONS

Li, Yuanzheng, Jia Shi, Heyu Chen, Rui Wang, Yang Mi, Cen Zhang, Wenna Du et al. "The Auger process in multilayer WSe 2 crystals." Nanoscale 10, No. 37 (2018): 17585-17592.

Robert, Cédric, D. Lagarde, F. Cadiz, G. Wang, Benjamin Lassagne, Thierry Amand, Andrea Balocchi et al. "Exciton radiative lifetime in transition metal dichalcogenide monolayers." Physical review B 93, No. 20 (2016): 205423.

Wang, Haining, Changjian Zhang, and Farhan Rana. "Ultrafast dynamics of defect-assisted electron-hole recombination in monolayer MoS2." Nano letters 15, No. 1 (2015): 339-345.

Wang, Haining, Changjian Zhang, and Farhan Rana. "Surface recombination limited lifetimes of photoexcited carriers in few-layer transition metal dichalcogenide MoS2." Nano letters 15, No. 12 (2015): 8204-8210.

McCreary, Kathleen M., Aubrey T. Hanbicki, Saujan V. Sivaram, and Berend T. Jonker. "A-and B-exciton photoluminescence intensity ratio as a measure of sample quality for transition metal dichalcogenide monolayers." Apl Materials 6, No. 11 (2018): 111106.

Newaz, A. K. M., Dhiraj Prasai, Jed I. Ziegler, Dave Caudel, Steve Robinson, Richard F. Haglund Jr, and Kirill I. Bolotin. "Electrical control of optical properties of monolayer MoS2." Solid State Communications 155 (2013): 49-52.

Mak, Kin Fai, Keliang He, Changgu Lee, Gwan Hyoung Lee, James Hone, Tony F. Heinz, and Jie Shan. "Observation of Tightly bound trions in monolayer MoS 2." Nature materials 12, No. 3 (2013): 207-211.

Nozaki, Junji, Musashi Fukumura, Takaaki Aoki, Yutaka Maniwa, Yohei Yomogida, and Kazuhiro Yanagi. "Manipulation of local optical properties and structures in molybdenum-disulfide monolayers using electric field-assisted near-field techniques." Scientific reports 7, No. 1 (2017): 1-7.

Ross, Jason S., Sanfeng Wu, Hongyi Yu, Nirmal J. Ghimire, Aaron M. Jones, Grant Aivazian, Jiaqiang Yan et al. "Electrical control of neutral and charged excitons in a monolayer semiconductor." Nature communications 4, No. 1 (2013): 1-6.

Ma, Nan, and Debdeep Jena. "Carrier statistics and quantum capacitance effects on mobility extraction in two-dimensional crystal semiconductor field-effect transistors." 2D Materials 2, No. 1 (2015): 015003.

\* cited by examiner

METHOD FOR MEASURING THE TRAP DENSITY IN A 2-DIMENSIONAL SEMICONDUCTOR MATERIAL

CROSS-REFERENCE TO RELATED APPLICATIONS

The present application is a non-provisional patent application claiming priority to European Patent Application No. 20175167.4, filed on May 18, 2020, the contents of which are hereby incorporated by reference.

FIELD OF THE DISCLOSURE

The present disclosure is related to the characterization of 2-dimensional semiconductor materials, and in particular to a non-invasive technique that enables the determination of the trap density of these materials.

BACKGROUND

Two-dimensional materials such as graphene and TMDC materials (transition metal dichalcogenide), have been under intense study for the past several years due to their unique mechanical and electrical properties. Of particular interest are the 2D semiconductor materials, i.e. 2D materials which exhibit a bandgap. The TMDC materials $MoS_2$ and $WS_2$ are examples of such 2D semiconductor materials. One of the factors that can strongly influence the performance of 2D semiconductor materials is the trap density which is dependent on intrinsic or contamination-related material properties of the 2D material, and on the substrate onto which the 2D layers are placed. Defects within the material or at the interface with the support substrate may generate electron or hole traps in the bandgap.

For both graphene and TMDCs, it has been shown that traditional support substrates such as $SiO_2$ can cause increased scattering, while enhanced performance is achieved when atomically flat 2D dielectrics, such as hexagonal boron nitride (hBN), are employed as support substrates. Performance, however, is often measured in terms of carrier mobility, which requires full device processing before the metric can be acquired. Device processing can however introduce non-idealities in the material which are difficult to deconvolute from electrical measurements.

The use of photoluminescence-based techniques has been explored for studying the properties of the interface between 2D TDMC materials and different support substrates. The direct photoluminescence peak of one monolayer of $MoS_2$, around 1.8 eV, contains information on thickness, doping, and strain. Also, direct exciton lifetime measurements can give insights on interface scattering.

However, at this time there is no practical non-invasive technique that facilitates measurement of the trap density in a 2D semiconductor material. Such a technique could be beneficial for the in-line measurements of the trap density in a semiconductor production process.

SUMMARY

According to the method of the disclosure, a spot on a layer of a 2D semiconductor material deposited on a support substrate is irradiated so as to generate excitons, so that photons are emitted from the layer. The photoluminescence spectrum is recorded and this is repeated for different values of the charge carrier concentration in the layer. The modulation of the charge carrier concentration may be realized by modulating the output power of the light source used to irradiate the sample, for example, a laser. The ratio is recorded between the photoluminescence intensity of a first peak in the spectrum related to radiative recombination from indirect bandgaps and the intensity of a second peak in the spectrum related to radiative recombination from direct bandgaps. More particularly, the relation is recorded between the ratio and the carrier concentration. This recorded relation is fitted to a theoretical model of the ratio that takes into account both recombination mechanisms, radiative and non-radiative. From this fitting process, the trap density within the bandgap is derived. The disclosure is related to an apparatus configured to perform the method of the disclosure.

The disclosure is in particular related to a method for determining a trap density in a layer of a 2-dimensional semiconductor material, the layer exhibiting direct and indirect bandgaps between the valence band and the conduction band of the material, the method comprising the steps of:

providing a support substrate carrying on its surface the layer of 2D semiconductor material, illuminating a spot of the layer with a light beam, thereby generating electron-hole pairs, detecting emitted photons generated by direct and indirect bandgap transitions generated by radiative recombination of the electron-hole pairs, and determining a direct photoluminescence intensity $I_{dir}$ and an indirect photoluminescence intensity $I_{ind}$, repeating the two preceding steps at different values of the charge carrier concentration in the layer by modulating the charge carrier concentration, to thereby obtain a measured relation between the ratio $I_{ind}/I_{dir}$ and the carrier concentration, fitting the measured relation to a theoretical relation that takes into account both radiative and non-radiative recombination mechanisms, the theoretical relation being also a function of the trap density, and calculating the trap density from the theoretical relation that fits the measured relation.

According to an embodiment, the carrier concentration is modulated by illuminating the spot with a laser and by modulating the output power of the laser.

According to an embodiment, the layer of 2D semiconductor material is deposited on a dielectric layer that is itself deposited on an electrically conductive substrate, and wherein the carrier concentration is modulated by changing a bias voltage between the layer of 2D semiconductor material and the conductive substrate.

According to an embodiment, the layer of 2D semiconductor material consists of at least two monolayers of a transition metal dichalcogenide material, hereafter abbreviated as a TMDC material. The TMDC material may be $MoS_2$ or $WS_2$.

According to an embodiment, the theoretical relation between the ratio $I_{ind}/I_{dir}$ and the carrier concentration is the following:

$$\frac{I_{ind}}{I_{dir}} \propto \frac{1}{\tau_{rad-ind}^{eff} B n_d N^2 (1 - F_d) + 1 + a} + b$$

wherein $\tau_{rad-ind}^{eff}$ (in seconds) is the radiative lifetime of the excitons in the indirect bandgap, B is the Auger rate constant 1, N is the carrier concentration (in $cm^{-2}$), $n_d$ the trap density (in cm$^{-2}$), $F_d$ the defect occupancy state, and a and b are correction terms which account for experimental uncertainties.

The disclosure is related to an apparatus for performing the method of the disclosure, the apparatus comprising:
A light source,
A photon detector,
A processing and calculation unit coupled to the detector and configured to
determine the ratio $I_{ind}/I_{dir}$ at various carrier concentrations, thereby obtaining the measured relation between the ratio $I_{ind}/I_{dir}$ and the carrier concentration,
fit the measured relation to the theoretical relation, and
derive from the fitting step a value of the trap density.

According to an embodiment, the light source is a laser configured to produce a laser beam, the output power of which may be incremented within in a given range.

According to an embodiment, the light source is a laser and the apparatus further comprises a voltage probe configured to apply a bias voltage to the layer of 2D semiconductor material.

According to an embodiment, the apparatus is integrated in an apparatus for producing the layer of 2D semiconductor material on the support substrate.

The disclosure is related to the use of the method of the disclosure, for performing in-line measurements of the trap density in a semiconductor processing line.

The disclosure is related to the use of the apparatus of the disclosure, for performing in-line measurements of the trap density in a semiconductor processing line.

The disclosure is related to a computer program product configured to run on a processing and calculation unit and execute the steps stated above.

BRIEF DESCRIPTION OF THE FIGURES

The above, as well as additional, features will be better understood through the following illustrative and non-limiting detailed description of example embodiments, with reference to the appended drawings.

Figure 1:
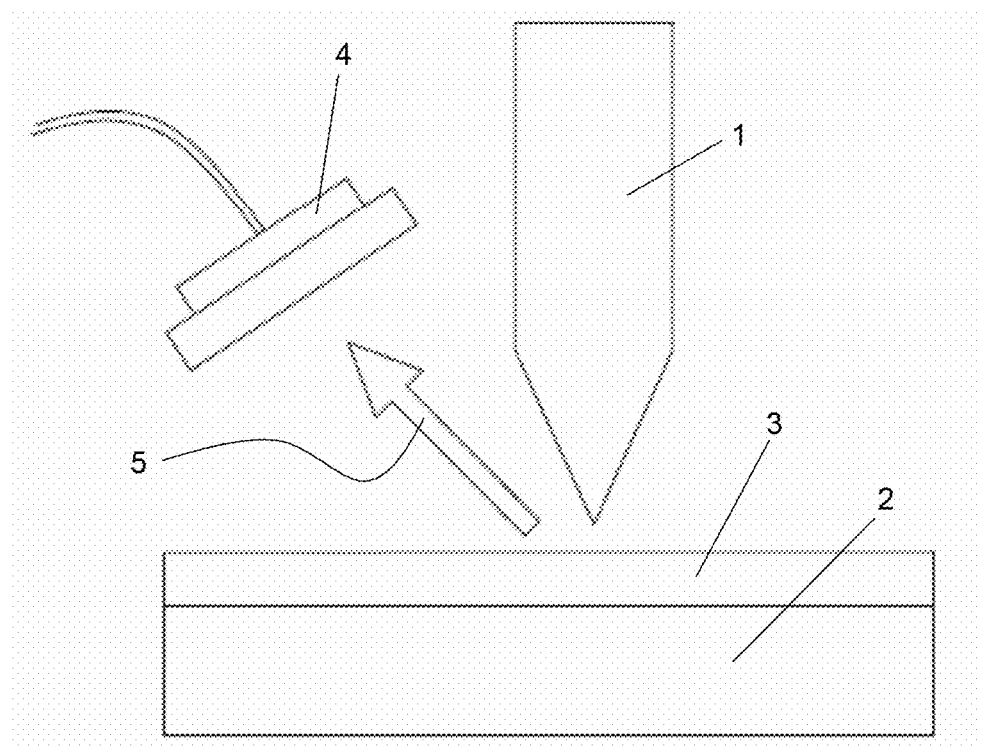
FIG. 1 illustrates a measurement setup for performing the method of the disclosure, according to an example.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

As stated above, the direct photoluminescence peak of TMDC semiconductor materials has been used for characterizing a monolayer of the material. However, when multilayer TMDC is considered, the material transitions from a direct bandgap material to an indirect bandgap material, i.e. the material exhibits both direct and indirect bandgap. The band gap is the energy gap between the valence band and the conduction band of the material. For a direct bandgap, the crystal momentum is the same at the maximum energy level of the valence band and at the minimum energy level of the conduction band, whereas for an indirect bandgap, there is a shift in the crystal momentum between the maximum energy of the valence band and the minimum level of the conduction band. This results in differences in terms of the dominant recombination mechanism occurring in the material.

When light is irradiated on a 2D semiconductor material, electron-hole pairs—excitons—are generated by an electron being excited from the valence band to the conduction band, provided that the photon energy of the light source is in excess of the bandgap of the material. Once generated, the electron-hole pair can recombine again through 3 mechanisms: radiative recombination, Shockley-Read-Hall (SRH) recombination, or defect-assisted Auger recombination. Radiative recombination occurs through the emission of a photon, which is detectable and which contributes to a specific peak in the photoluminescence (hereafter abbreviated as PL) spectrum, hereafter referred to as the "direct peak." Non-radiative recombination, i.e. SRH or defect-assisted Auger recombination, occurs when the exciton combines with a defect-generated trap state.

Radiative recombination is the dominant mechanism for direct bandgaps, even when the trap density is high, as only a photon is needed for the excitons to decay, but for indirect bandgaps, both photons and phonons are needed for radiative recombination, the phonons being required for compensating the difference in crystal momentum. Therefore, non-radiative recombination mechanisms become more important in the case of indirect bandgaps, and in the presence of a sufficiently high trap density. However, with low enough trap density, radiative recombination still occurs also for indirect bandgaps, leading to the appearance of an indirect peak in the PL spectrum, at a lower photon energy compared to the direct peak. The intensity of the indirect peak decreases when the trap density becomes higher. However, the indirect peak is also an inverse function of the carrier concentration in the material. The higher the number of charge carriers, the higher the number of carriers which can recombine with trap states, hence the lower the indirect peak.

The method of the disclosure uses the above-described relations for determining the trap density through a series of PL measurements at different carrier concentrations, in a 2D semiconductor material that exhibits both direct and indirect bandgaps, like for example a $WS_2$ or $MoS_2$ layer thicker than 2 monolayers. The ratio of the PL intensity (i.e. the photon count) of the indirect peak $I_{ind}$ to the PL intensity of the direct peak $I_{dir}$ is recorded as a function of the carrier concentration. The relation between $I_{ind}/I_{dir}$ and the carrier concentration is then fitted to a theoretical model of the interaction between the carrier concentration and the trap density, taking into account the different recombination mechanisms. According to this model, the inverse relation between the ratio $I_{ind}/I_{dir}$ and the carrier concentration is different for each value of the trap density. So by fitting the measured relation to one of the theoretical relations, the trap density is obtained.

It has been found in prior research that for TMDC 2D-semiconductor materials, the dominant non-radiative recombination mechanism is the defect-assisted Auger mechanism. Taking into account this knowledge, i.e. neglecting the influence of SRH recombination in favor of radiative and Auger recombination, the inventors have developed a theoretical model that links the ratio $I_{ind}/I_{dir}$ to the carrier concentration and the trap density according to the following equation:

$$\frac{I_{ind}}{I_{dir}} \propto \frac{1}{\tau_{rad-ind}^{eff} Bn_d N^2 (1 - F_d) + 1 + a} + b \quad (1)$$

wherein $\tau_{rad-ind}^{eff}$ (in seconds) is the radiative lifetime of the excitons in the indirect bandgap. $\tau_{rad-ind}^{eff}$ can be measured or if a measured value is not available it can be used as a fitting parameter (see further). B is the Auger rate constant which can be measured or of which a value or at least an applicable range can be taken from literature for each 2D-semiconductor material. In the last case, B can be used as a fitting parameter within the range (see below). N is the carrier concentration (in $cm^{-2}$), $n_d$ the trap density in the band gap (in $cm^{-2}$) and $F_d$ the defect occupancy state. $F_d$ is related to the Fermi level of the material, and is obtainable from literature. The variables a and b are correction terms which account for experimental uncertainties. The terms a and b can be set to zero or used as fitting parameters if the zero value of a and b does not allow for fitting the experimental data to the theoretical model. The '$\propto$' symbol indicates "is proportional to."

The method of the disclosure is performed on a sample comprising a support substrate carrying on its surface a layer of a 2D semiconductor material produced thereon, the layer exhibiting both direct and indirect bandgaps. The layer may for example be a TMDC 2D semiconductor material, such as $MoS_2$ or $WS_2$, with thickness greater than two monolayers. The layer is then illuminated by a light beam configured to generate a plurality of excitons. This is typically a laser beam directed to a spot of the layer. The spot may have a diameter on the order of micrometers, for example about 1 µm. For $MoS_2$ or $WS_2$, a laser beam with a wavelength of 532 nm is suitable. Photons emitted from the spot are detected by a detector configured to obtain the photoluminescence spectrum of the illuminated spot, i.e. the number of the detected photons as a function of their energy. This measurement may be performed using laser and detector tools which are known for performing photoluminescence measurements.

According to an embodiment, the carrier concentration is modulated by incrementally changing the output power of the laser within a given range. A conceptual view of the required measurement setup is shown in FIG. 1. A laser 1 is oriented perpendicularly to a sample (other angles of the laser are also possible however), which comprises the base substrate 2 carrying a layer 3 of the 2D semiconductor material under investigation. A photon detector 4 is mounted laterally with respect to the laser, and is configured to detect photons 5 emitted from the irradiated surface of the layer 3.

Figure 2:
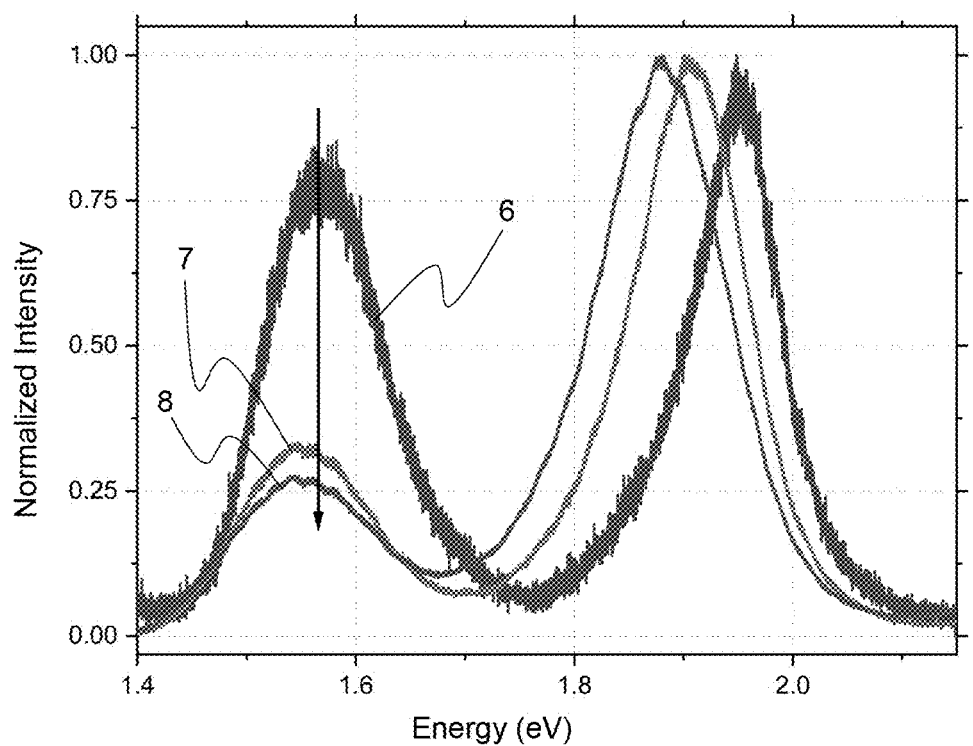
FIG. 2 illustrates the influence of the carrier concentration on the indirect and direct transition peaks in the photoluminescence spectrum obtained by illuminating a spot on a flake of $WS_2$ having a uniform thickness of 5 nm, according to an example.

FIG. 2 shows the spectra measured on a $WS_2$ flake having a surface of a few square micrometers, present on a $SiO_2$ substrate. The flake has a uniform thickness of 5 nm, i.e. the flake consists of several monolayers of $WS_2$. The spectra labelled 6, 7 and 8 are respectively related to measurements obtained at 1%, 10%, and 25% of the maximum available laser power of 1.34 $MW/cm^2$ using a 532 nm wavelength laser beam of 1 µm in diameter. The image shows that the indirect peak, at about 1.55 eV, significantly decreases when the laser power increases. This is caused by an increase in non-radiative defect-assisted Auger recombination as the photogenerated carrier concentration increases. Due to conservation of momentum, the indirect peak is more sensitive to non-radiative recombination, explaining the experimental observations. The direct peak remains the same in amplitude but shifts along the X-axis in the range of 1.85 to 2 eV, likely from a combination of heating-induced strain and a small degree of local oxidation.

Figure 3:
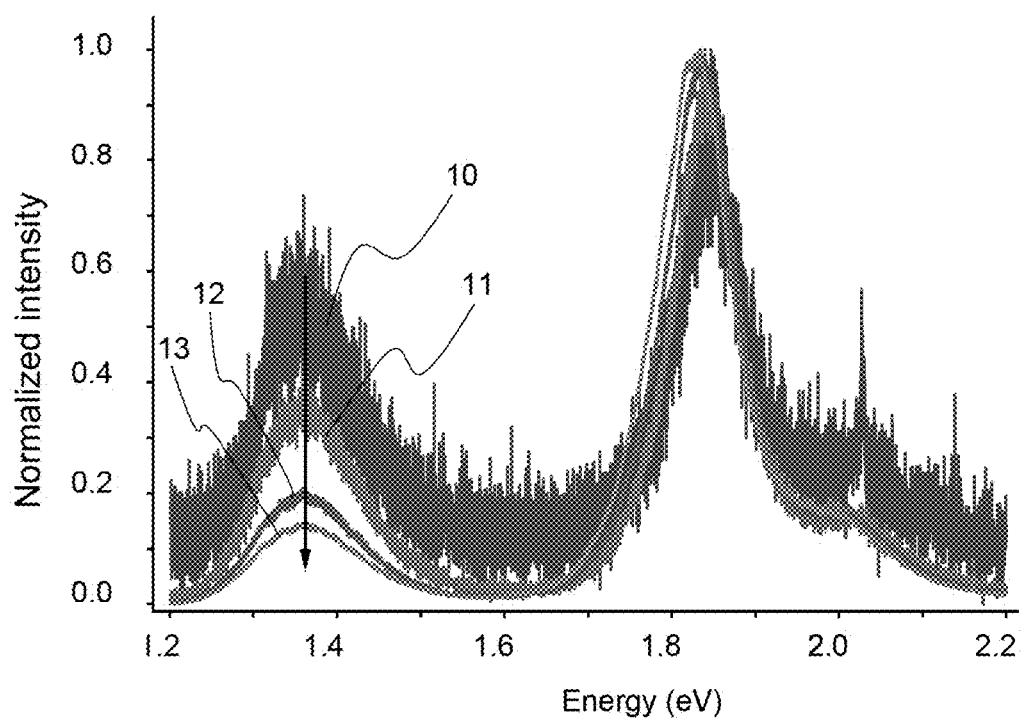
FIG. 3 illustrates the same effect on a layer of $MoS_2$, according to an example.

A similar set of spectra is illustrated in FIG. 3, measured on $MoS_2$. The spectra 10 through 13 corresponding respectively to 0.1%, 1%, 10%, and 25% of the maximum laser power.

The measurements illustrated in FIGS. 2 and 3 were obtained under the following conditions. Photoluminescence (PL) spectra were collected in a confocal Raman microscopic system, using exciting lasers with primary wavelength of 532 nm (green). The laser radiation is focused onto the 2D material using a 100× objective lens with a spot-size around 1 µm. Photoluminescence spectra were resolved by a spectrometer using gratings of 600 mm−1 and acquired by a CCD (charge-coupled device) detector. Measurements were performed at room temperature, in air.

Figure 4:
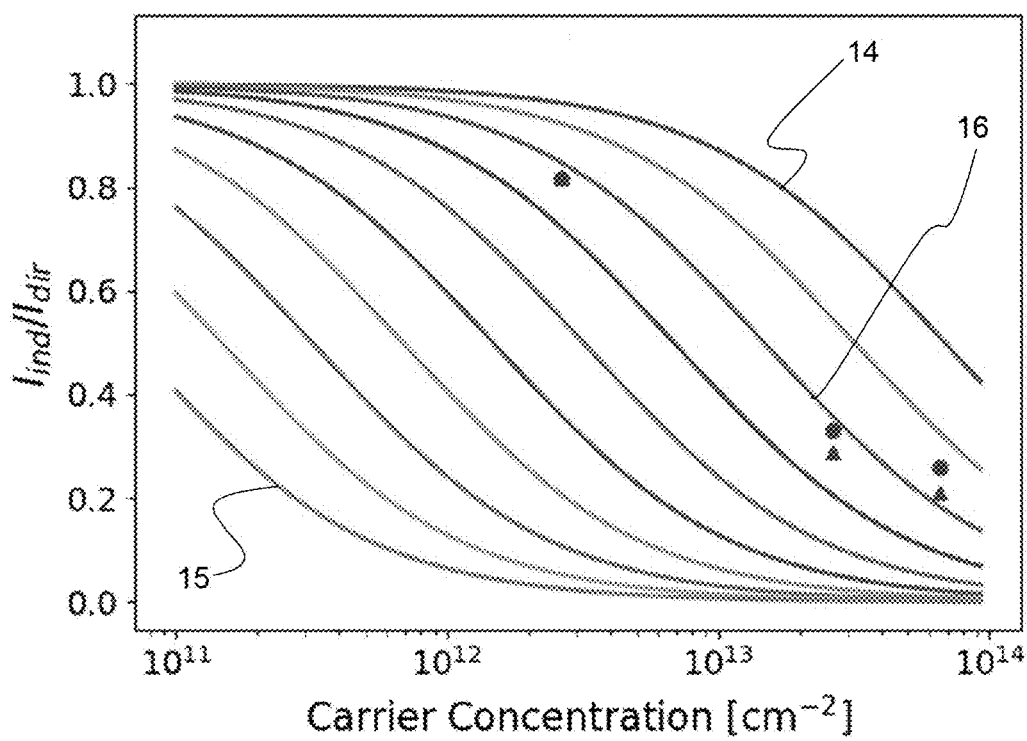
FIG. 4 illustrates how the values of the ratio $I_{ind}/I_{dir}$ measured as a function of the carrier concentration may be fitted to a theoretical model, according to an example.

The laser power is correlated to the carrier density through the following equation:

$$N = \frac{P_{laser}(1-R)\alpha}{A_{spot} h\nu} * \tau_{carrier} \quad (2)$$

Wherein $P_{laser}$ is the laser power (in $W/cm^2$), $A_{spot}$ is the excitation area (in $cm^2$), hν the excitation photon energy (in J), R the Fresnel reflection coefficient and α the absorption coefficient of the 2D material. R and α are known from literature. For example for $WS_2$, R=0.6 and α=0.05 $\tau_{carrier}$ is the carrier lifetime (in seconds), which can be measured using known techniques, such as time resolved photoluminescence, or a value or at least an applicable range can be found in literature. In the latter case, $\tau_{carrier}$ can be used as a fitting parameter. FIG. 4 shows a number of curves which reflect the theoretical relation (1) for $WS_2$ and for different values of the trap density, ranging from $1 \times 10^{10}$ $cm^{-2}$ for the upper curve 14 to $1 \times 10^{13}$ $cm^{-2}$ for the lower curve 15. Superimposed on these curves are the measured values of the ratio $I_{ind}/I_{dir}$ as a function of the carrier concentration, taking into account the relation (2), and measured on two similar $WS_2$ flakes, as indicated by the two different symbols '▲' and '●'. The correction factors a and b were set to zero. The lifetime of the indirect transition $\tau_{rad-ind}^{eff}$ is treated as a fitting parameter, since a precise determination of this value is yet unavailable for $WS_2$ and $MoS_2$. All other parameters were determined from literature. The fitting process involved searching for the value of $\tau_{rad-ind}^{eff}$ for which the measured data correspond as close as possible to one of the theoretical curves, within reasonable bounds. For the data points measured on $WS_2$, it was found that when $\tau_{rad-ind}^{eff}$ is 1 nanosecond, the measured data fit to the theoretical curve 16 corresponding to a trap density of $4.6 \times 10^{10}$ $cm^{-2}$. This illustrates how the trap density can be obtained by the method of the disclosure.

The example of the measured data points obtained on WS$_2$ and shown in FIG. 4 was successful for obtaining the trap density using only $\tau_{rad-ind}^{eff}$ as a fitting parameter, while all the other parameters were either measured or taken from literature, and with correction terms a and b set to zero. However, the method is applicable also when additional parameters are not known or only known within a given range. For example, if measured values of B and $\tau_{carrier}$ are not available, nor good estimates of the correction terms a and b, the method may use a fitting algorithm that starts from estimated values for the unknown parameters, possibly lying within predetermined ranges obtained from literature. The fitting process is then performed by iterative steps until a closest match is found between the measured data and the theoretical model, yielding the trap density. Such algorithms are known as such in the art.

Figure 5:
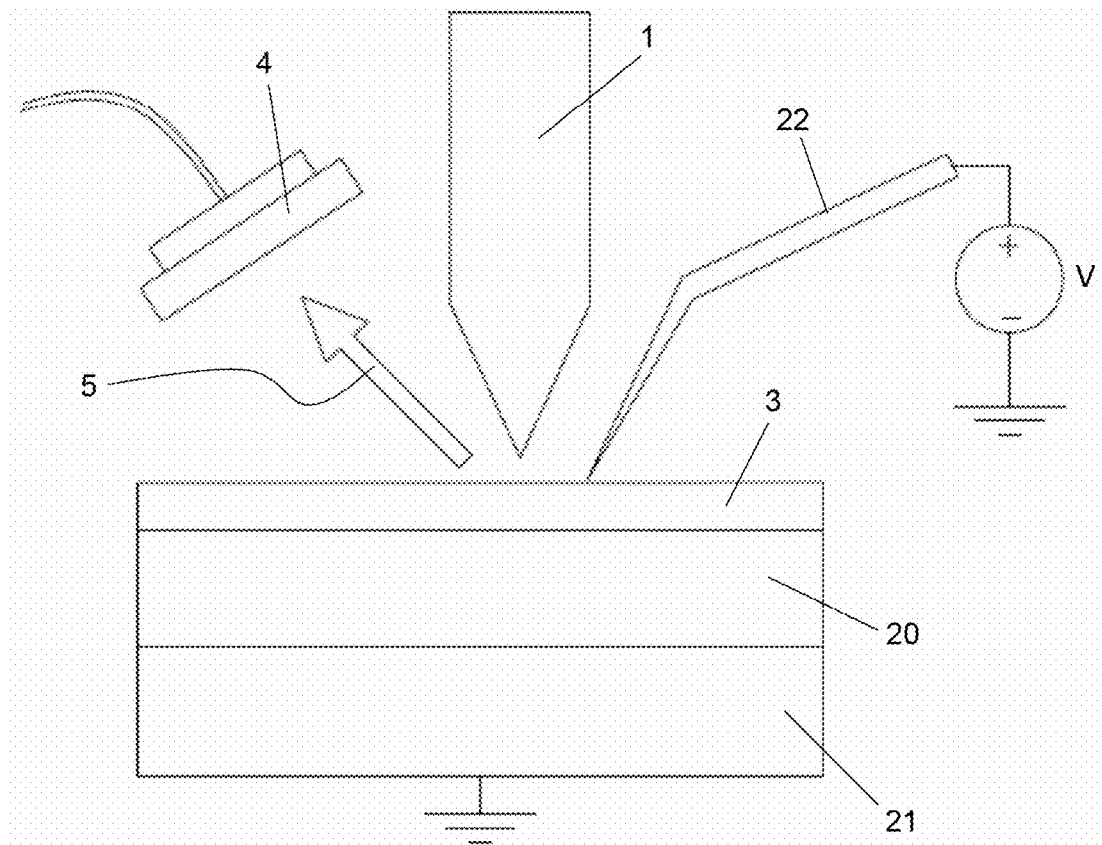
FIG. 5 illustrates a measurement setup for performing the method of the disclosure, according to an example.

According to another embodiment, the carrier concentration is modulated by using a constant laser power, and applying a variable back bias voltage to the substrate onto which the 2D semiconductor material is present. A conceptual view of the required measurement setup is shown in FIG. 5. In this case, the 2D material 3 is typically deposited on a dielectric layer 20, which is itself deposited on an electrically conductive substrate 21, such as a metal or a highly doped semiconductor. The conductive substrate 21 may be grounded, and the bias voltage may be applied by contacting the 2D material 3 with a probe needle 22 placed at the bias voltage level V relative to the conductive substrate 21. The relation between the bias voltage and the carrier concentration is known from literature, for example from the document "Carrier statistics and quantum capacitance effects on mobility extraction in two-dimensional crystal semiconductor field-effect transistors," Nan Ma and Debdeep Jena, 2D Materials, Volume 2, 2015. This paper takes into account the influence of the quantum capacitance of the dielectric layer 20, which is however only typically significant in the case of very thin dielectric layers. In practice however, the method according to this embodiment does not require such thin layers. A thicker dielectric layer 20 can thus be used wherein the quantum capacitance is negligible. In this case the carrier concentration can be calculated as the product of the applied bias voltage and the capacitance of the dielectric layer 20. The laser 1 and photon detector 4 are the same as in the setup shown in FIG. 1. By measuring the PL spectrum at different levels of the bias voltage, the measured relation between the ratio $I_{ind}/I_{dir}$ can thus also be determined, and the above-described fitting process yields the value of the trap density.

The equation (1) is valid also for other TMDC 2D-semiconductor materials besides WS$_2$. The disclosure is however not limited to these materials nor to the equation (1) for describing the theoretical model. For other materials, the balance between the different recombination mechanisms may require a different theoretical model to be developed. The method of the disclosure is applicable also in combination with such alternative models.

The method of the disclosure may be used in-situ or in-line. In situ refers to the measurement of the trap density in the same tool as the one used for producing the 2D semiconductor material on its support substrate. In-line refers to the integration of the method into a semiconductor production process. The latter application is particularly useful as the method of the disclosure is non-invasive and may be executed quickly without slowing down or disrupting a production line. The method of the disclosure does not require the fabrication of a test device, and thereby avoids material defects induced by such device fabrication.

Figure 6:
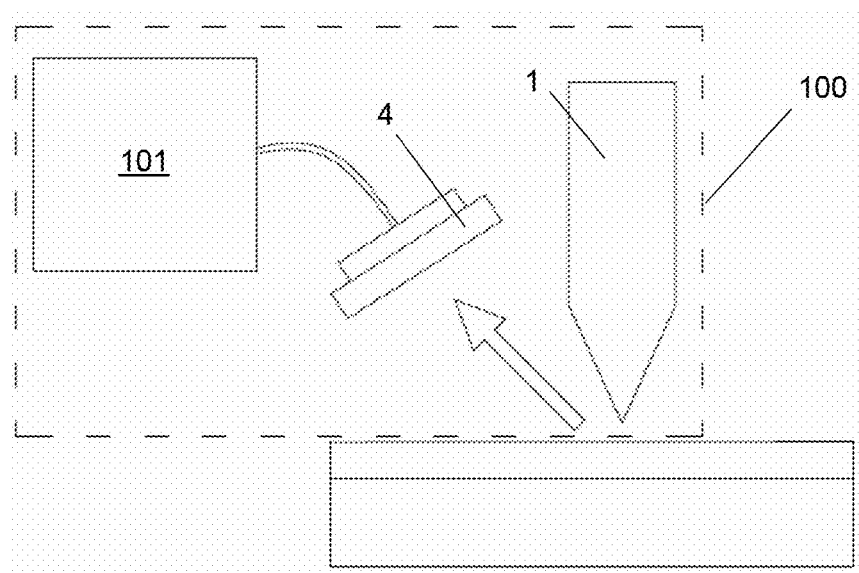
FIG. 6 shows an apparatus, according to an example.

The disclosure is related to an apparatus configured to perform the method of the disclosure. Such an apparatus may be devised for measurements in-situ or for measurements in-line, and the precise details of the apparatus may be slightly different according to these conditions. However, and as illustrated in FIG. 6 for an apparatus 100 suitable for performing the method according to the embodiment of FIG. 1, the basic components of any apparatus according to the disclosure can include the following:

A light source 1,
A photon detector 4,
A processing and calculation unit 101 coupled to the photon detector 4 and configured to:
determine the ratio $I_{ind}/I_{dir}$ at various carrier concentrations, thereby obtaining the measured relation between the ratio $I_{ind}/I_{dir}$ and the carrier concentration,
fit the measured relation to the theoretical relation,
derive from the fitting step a value of the trap density.

The processing and calculation unit 101 may be a computer programmed to determine the measured relation between $I_{ind}/I_{dir}$ and the carrier concentration and further comprising the theoretical relation, for example equation (1) and an algorithm for performing the fitting process and the determination of the trap density. The disclosure is also related to a computer program configured to perform the above steps, when the program is run on the processing and calculation unit 101.

While the disclosure has been illustrated and described in detail in the drawings and foregoing description, such illustration and description are to be considered illustrative or exemplary and not restrictive. Other variations to the disclosed embodiments can be understood and effected by those skilled in the art in practicing the claimed disclosure, from a study of the drawings, the disclosure and the appended claims. The mere fact that certain measures are recited in mutually different dependent claims does not indicate that a combination of these measures cannot be used to advantage. Any reference signs in the claims should not be construed as limiting the scope.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method comprising:
   illuminating a layer of a two-dimensional (2D) semiconductor material with a first light beam having a first intensity, thereby generating first electron-hole pairs having a first concentration;
   determining a first direct photoluminescence intensity Idir corresponding to direct bandgap radiative combination of the first electron-hole pairs and a first indirect photoluminescence intensity $I_{ind}$ corresponding to indirect bandgap radiative combination of the first electron-hole pairs;
   illuminating the layer with a second light beam having a second intensity that is different from the first intensity, thereby generating second electron-hole pairs having a second concentration that is different from the first concentration;

determining a second direct photoluminescence intensity Ian corresponding to direct bandgap radiative combination of the second electron-hole pairs and a second indirect photoluminescence intensity $L_{ind}$ corresponding to indirect bandgap radiative combination of the second electron-hole pairs; and determining a trap density of the layer based on the first concentration, the second concentration, the first direct photoluminescence intensity, the first indirect photoluminescence intensity, the second direct photoluminescence intensity, and the second indirect photoluminescence intensity.

2. The method according to claim 1, wherein the layer of the 2D semiconductor material is deposited on a dielectric layer that is deposited on an electrically conductive substrate, the method further comprising:

applying a first voltage between the layer of the 2D semiconductor material and the electrically conductive substrate while illuminating the layer of the 2D semiconductor material with the first light beam; and applying a second voltage between the layer of the 2D semiconductor material and the electrically conductive substrate while illuminating the layer of the 2D semiconductor material with the second light beam, wherein the second voltage is different from the first voltage.

3. The method according to claim 1, wherein the layer of the 2D semiconductor material comprises at least two monolayers of a transition metal dichalcogenide (TMDC).

4. The method according to claim 3, wherein the TMDC is $MoS_2$ or $WS_2$.

5. The method according to claim 1, wherein determining the trap density comprises determining the trap density using:

$$\frac{I_{ind}}{I_{dir}} \propto \frac{1}{\tau_{rad-ind}^{eff} B n_d N^2 (1-F_d) + 1 + a} + b$$

wherein $\tau_{rad-ind}^{eff}$ is a radiative lifetime of electron-hole pairs in the indirect bandgap, B is the Auger rate constant, N is the carrier concentration, $n_d$ the trap density, $F_d$ the defect occupancy state, and a and b are correction terms which account for experimental uncertainties.

6. The method according to claim 1, wherein determining the trap density comprises confirming the trap density during in-line processing of the 2D semiconductor material.

7. The method according to claim 1, wherein determining the trap density comprises determining the trap density based on a ratio of the first indirect photoluminescence intensity to the first direct photoluminescence intensity.

8. The method according to claim 1, wherein determining the trap density comprises determining the trap density based on a ratio of the second indirect photoluminescence intensity to the second direct photoluminescence intensity.

9. The method according to claim 1, wherein the first light beam or the second light beam comprises a laser.

* * * * *